United States Patent
Singh

(10) Patent No.: US 9,749,178 B2
(45) Date of Patent: Aug. 29, 2017

(54) TECHNIQUES TO DYNAMICALLY CONFIGURE TARGET BITRATE FOR STREAMING NETWORK CONNECTIONS

(71) Applicant: WhatsApp Inc., Mountain View, CA (US)

(72) Inventor: Manpreet Singh, San Carlos, CA (US)

(73) Assignee: WHATSAPP INC., Menlo Park, CA (US)

( * ) Notice: Subject to any disclaimer, the term of this patent is extended or adjusted under 35 U.S.C. 154(b) by 32 days.

(21) Appl. No.: 14/859,141

(22) Filed: Sep. 18, 2015

(65) Prior Publication Data

US 2017/0085420 A1    Mar. 23, 2017

(51) Int. Cl.
*H04L 12/24*  (2006.01)
*H04L 12/26*  (2006.01)
*H04L 29/06*  (2006.01)

(52) U.S. Cl.
CPC ...... *H04L 41/0803* (2013.01); *H04L 43/0888* (2013.01); *H04L 43/0894* (2013.01); *H04L 65/1069* (2013.01); *H04L 69/22* (2013.01)

(58) Field of Classification Search
CPC ............. H04L 41/0803; H04L 43/0894; H04L 65/1069; H04L 69/22; H04L 43/0888
See application file for complete search history.

(56) References Cited

U.S. PATENT DOCUMENTS

| | | | |
|---|---|---|---|
| 9,106,787 B1* | 8/2015 | Holmer | H04L 43/087 |
| 2003/0103243 A1* | 6/2003 | Watanabe | H04N 21/2381 358/405 |
| 2003/0231589 A1* | 12/2003 | Itoh | H04L 1/0002 370/230 |
| 2006/0218264 A1* | 9/2006 | Ogawa | H04L 47/10 709/223 |

* cited by examiner

*Primary Examiner* — Mohammad Anwar

(57) ABSTRACT

Techniques to dynamically configure target bitrate for streaming network connections are described. An apparatus may comprise a streaming component operative to establish a streaming network connection with a second client device at a first client device; and a stream configuration component operative to determine inter-arrival rate information for the streaming network connection; provide the inter-arrival rate information to an inter-arrival rate analysis component; receive a preliminary target bitrate from the inter-arrival rate analysis component in response to providing the inter-arrival rate information to the inter-arrival rate analysis component; determine round-trip time information for the streaming network connection; determine an assigned target bitrate and a packet size setting for the streaming network connection based on the preliminary target bitrate and the round-trip time information; and configure the streaming component to perform the streaming network connection with the assigned target bitrate and the packet size setting. Other embodiments are described and claimed.

20 Claims, 11 Drawing Sheets

600

Establish a streaming network connection with a second client device at a first client device.
602

Determine inter-arrival rate information for the streaming network connection.
604

Provide the inter-arrival rate information to an inter-arrival rate analysis component.
606

Receive a preliminary target bitrate from the inter-arrival rate analysis component in response to providing the inter-arrival rate information to the inter-arrival rate analysis component.
608

Determine round-trip time information for the streaming network connection.
610

Determine an assigned target bitrate and a packet size setting for the streaming network connection based on the preliminary target bitrate and the round-trip time information.
612

Configure the streaming component to perform the streaming network connection with the assigned target bitrate and the packet size setting.
614

*FIG. 6*

TECHNIQUES TO DYNAMICALLY CONFIGURE TARGET BITRATE FOR STREAMING NETWORK CONNECTIONS

RELATED APPLICATIONS

This application is related to the United States Patent Application titled "Techniques to Dynamically Configure Jitter Buffer Sizing," with Ser. No. 14/858,492, filed on Sep. 18, 2015, which is hereby incorporated by reference in its entirety.

BACKGROUND

Users of mobile devices, such as smartphones, may use their mobile devices to execute applications. These applications may perform communications and network tasks on behalf of their user. An application may comprise a messaging client for communication between users. This communication may include the transmission of streaming content, including streaming audio content such as a voice-over-Internet-Protocol (VoIP) communication exchange.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to dynamically configure target bitrate for streaming network connections. Some embodiments are particularly directed to techniques to dynamically configure target bitrate for streaming network connections based on inter-arrival rate and round-trip time. In one embodiment, for example, an apparatus may comprise a streaming component operative to establish a streaming network connection with a second client device at a first client device; and a stream configuration component operative to determine inter-arrival rate information for the streaming network connection; provide the inter-arrival rate information to an inter-arrival rate analysis component; receive a preliminary target bitrate from the inter-arrival rate analysis component in response to providing the inter-arrival rate information to the inter-arrival rate analysis component; determine round-trip time information for the streaming network connection; determine an assigned target bitrate and a packet size setting for the streaming network connection based on the preliminary target bitrate and the round-trip time information; and configure the streaming component to perform the streaming network connection with the assigned target bitrate and the packet size setting. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
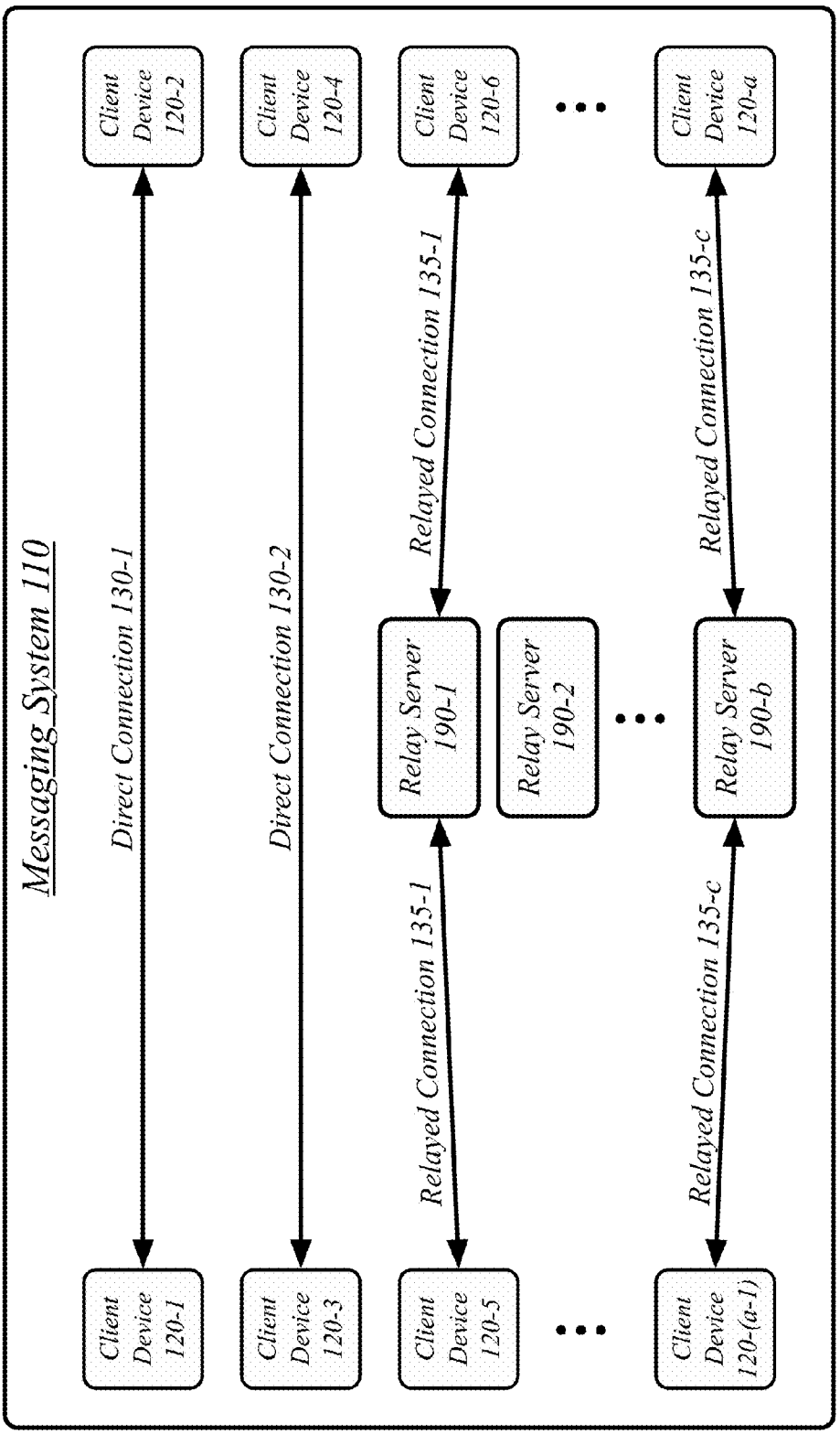
FIG. 1 illustrates an embodiment of a network stream configuration system.

The streaming of media content, such as media content captured locally on a mobile device—for instance, the streaming of live audio during a VoIP call or the streaming of live video during a video call—may be performed based on the assignment of a target bitrate to a streaming component responsible for the encoding and/or transmission of the streaming media content within limits based on the target bitrate. The media content may be encoded in order to fit within the limit defined by the target bitrate, with the target bitrate thereby serving as a maximum limit for the encoding of media content. This target bitrate may be determined based on the gathering of network performance information in order to prevent overwhelming a network connection. An overwhelmed network connection may result in delay or periodic interruption in the delivery of the media content, which may result in unsatisfactory playback of the media content, particularly where the media content is immediate and live and particularly where the media content is part of an interactive exchange (e.g., an interactive audio or video call), where the use of lengthy (e.g., more than one second) buffers introduces detectable lag in the exchange. Further, various network parameters, such as packet size, may be configured to improve network performance for the delivery of content within the target network bitrate. As a result, the embodiment can improve the performance and user experience of exchanging streaming media content between devices. These embodiments may be particularly useful in which one or more of the devices are operating on network of marginal capability for streaming network content, such as cellular data networks. While the embodiments may be appropriate for the transmission of live-captured media content, they may also be applied to the streaming of pre-recorded media content, particularly where that pre-recorded media content is encoded, re-encoded, or transcoded in parallel with the transmission of the media content such that its encoding parameter(s) may be adjusted based on network performance.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a network stream configuration system 100. In one embodiment, the network stream configuration system 100 may comprise a computer-implemented system having software applications comprising one or more components. Although the network stream configuration system 100 shown in FIG. 1 has a limited number of elements in a certain topology, it may be appreciated that the network stream configuration system 100 may include more or less elements in alternate topologies as desired for a given implementation.

A messaging system 110 may be generally arranged to receive, store, and deliver messages. The messaging system 110 may store messages while messaging clients, such as may execute on client devices 120 are offline and deliver the messages once the messaging clients are available. The messaging system 110 may empower the engagement and performance of other communication tasks, such as audio and/or video calls.

A plurality of client devices 120 may operate as part of the network stream configuration system 100, transmitting messages and otherwise communicating between each other as part of a messaging system 110. The client devices 120 may execute messaging clients for the messaging system 110, wherein each of the client devices 120 and their respective messaging clients are associated with a particular user of the messaging system 110. In some embodiments, the client devices 120 may be cellular devices such as smartphones and may be identified to the messaging system 110 based on a phone number associated with each of the client devices 120. In some embodiments, the client devices 120 may be identified to the messaging system 110 based on a user account registered with the messaging system 110—and potentially a social networking system that comprises or is associated with the messaging system 110—and logged into from the messaging client executing on the client devices 120. In general, each messaging client may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a messaging system 110 using web browser accessing a web server, for instance.

Streaming network connections within the messaging system 110 may be performed directly or via relay servers 190. A direct streaming network connection may correspond to a connection in which the outgoing network packets from one client device are addressed to either the destination client device or to a device directly masquerading as the destination client device, such as where a national address translation (NAT) device is used. NAT may be performed by, for example, routers used in the providing of home, business, or other local networks. A relayed streaming network connection may correspond to a connection in which the outgoing network packets from one client device are addressed to a relay server provided as part of the messaging system 110, the relay server then forwarding the network packets to the destination client device. Relay servers 190 may be used, for instance, to bridge NAT devices that are not configured to sufficiently expose a destination client device for the performance of a direct connection.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Network stream configuration system 100 may include an authorization server (or other suitable component(s)) that allows users to opt in to or opt out of having their actions logged by network stream configuration system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of network stream configuration system 100 and other elements of a messaging system through blocking, data hashing, anonymization, or other suitable techniques as appropriate. For instance, a user may be empowered to configure privacy settings determining whether network usage, such as streaming communication, is logged by the network stream configuration system 100 and analyzed. In some embodiments, a user may be presented with information regarding may be collected and how that information may be used, such as informing the user that collected information may be anonymized prior to analysis.

Figure 2:
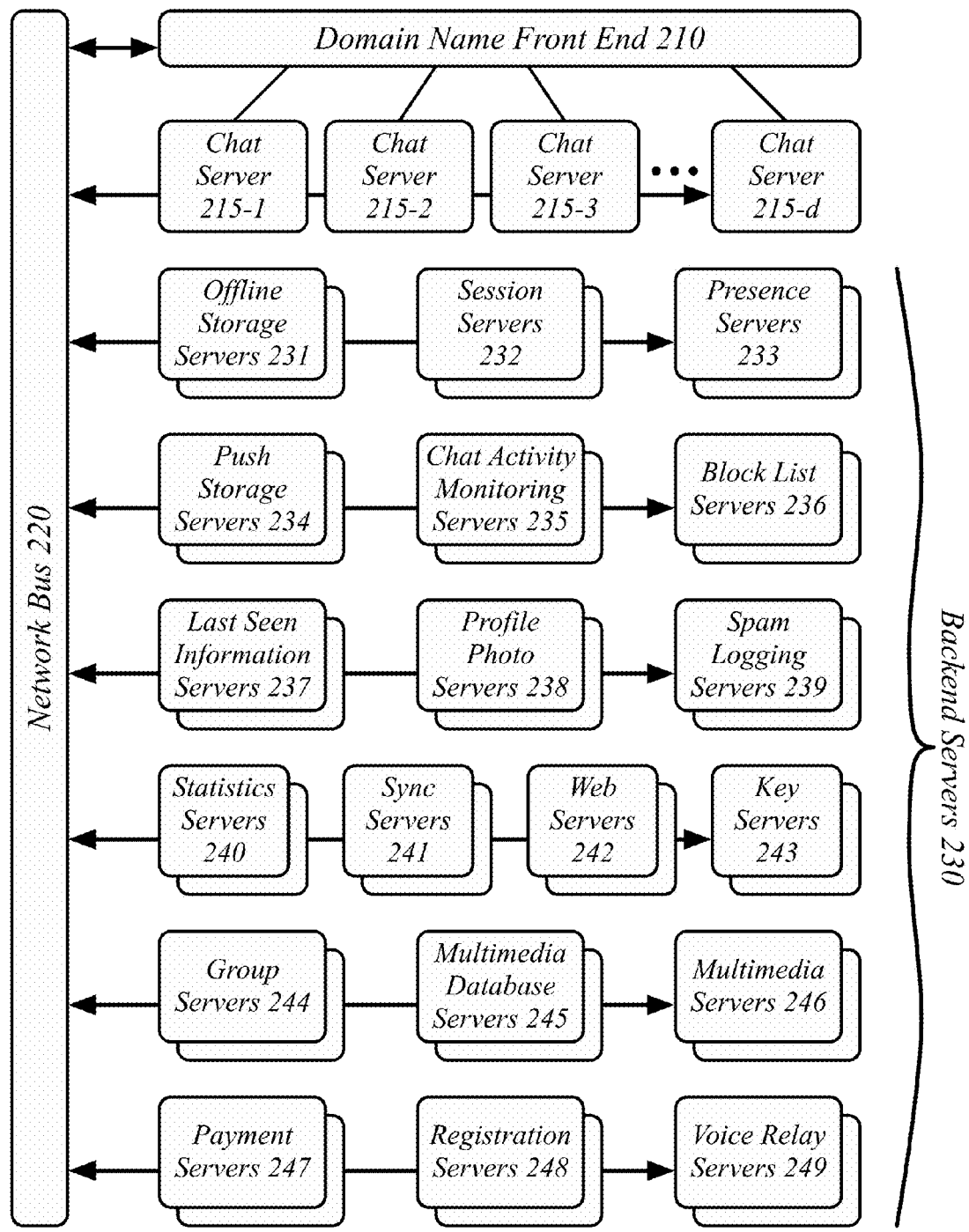
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the network stream configuration system 100 with the operations of the network stream configuration system 100 comprising a portion of the overall operations of the messaging system 200. The illustrated embodiment of the messaging system 200 may particularly correspond to a portion of the messaging system 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
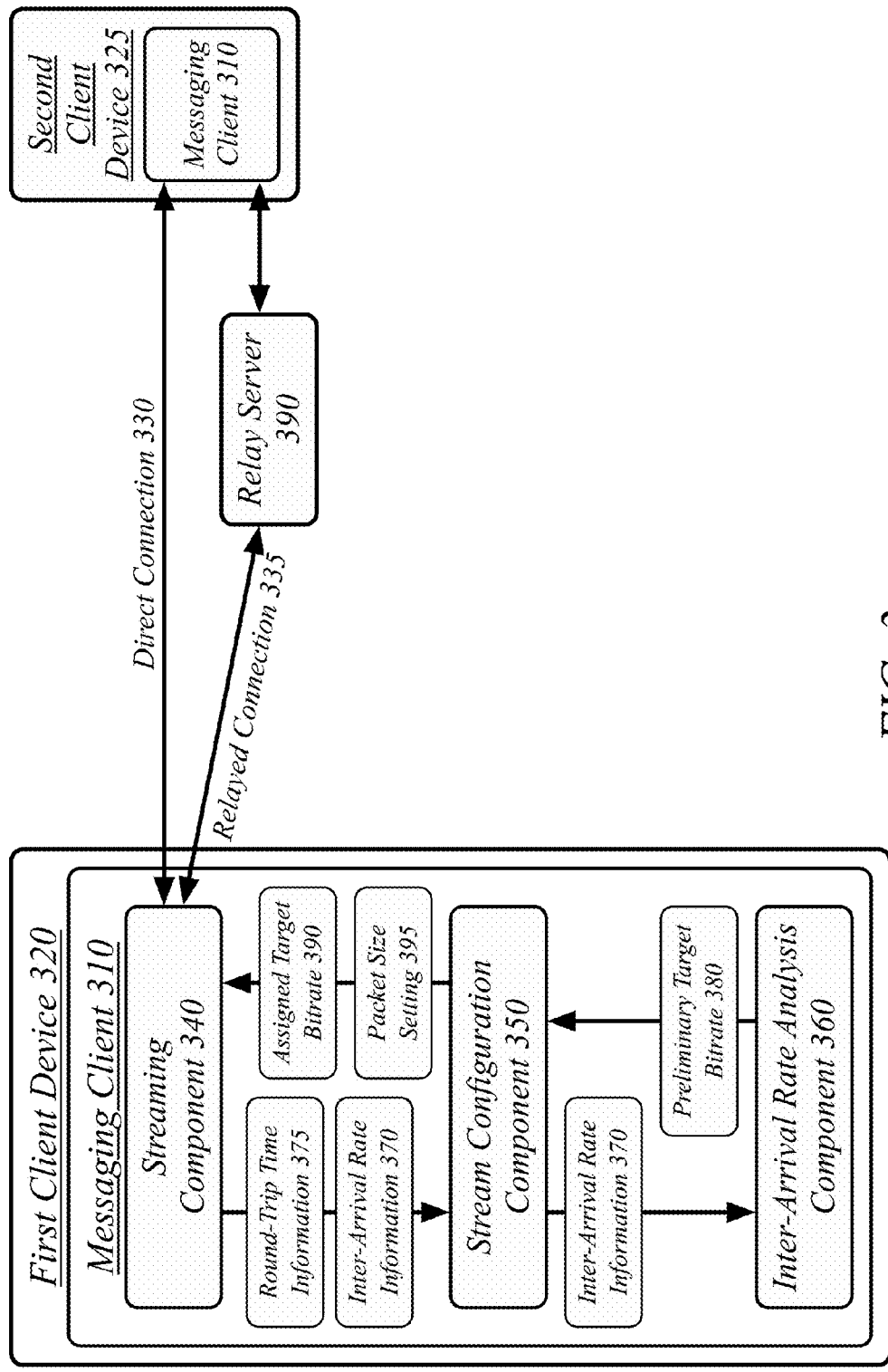
FIG. 3 illustrates an embodiment of a streaming network connection being configured.

FIG. 3 illustrates an embodiment of a streaming network connection being configured.

A first client device 320 may engage in a streaming network connection with a second client device 325. Each of the first client device 320 and second client device 325 may execute an instantiation of a messaging client 310. In some cases, the client devices 320, 325 may execute instantiations of different messaging clients that conform to a sufficiently common specification to empower interoperability.

In some cases, the streaming network connection may be a direct connection 330 in which the outgoing network packets from the first client device 320 are addressed to the public-facing address associated with the second client device 325 and the outgoing network packets from the second client device 325 are addressed to the public-facing address associated with the first client device 320. In other cases, the streaming network connection may be a relayed connection 335 in which the outgoing network packets from the first client device 320 and second client device 325 are addressed to a relay server 390, with the relay server 390 operative to forward network packets received from one client device to the other client device. A relay server 390 may comprise one relay server of a plurality of relay servers 190 provided as part of a messaging system 110.

A messaging client 310 may comprise a streaming component 340, the streaming component generally arranged to establish and carry out the performance of a streaming network connection carrying streaming media content. The streaming component 340 may provide network performance information to a stream configuration component 350, such as round-trip time information 375 and inter-arrival rate information 370.

Round-trip time information 375 may indicate the round-trip time for one or more network packets transmitted as part of the streaming network connection. The round-trip time for a particular network packet transmitted by a transmitting client device may comprise the amount of time lapsed between the transmission of the particular network packet and the receipt by the transmitting client device of an acknowledgement from the receiving client device of the reception of that particular network packet by the receiving client device. The round-trip time information 375 may comprise a plurality of round-trip times for a plurality of network packets transmitted by the first client device 320 and/or second client device 325. The round-trip time information 375 may comprise a mean, median, mode, or other holistic measure of an aggregated collection of round-trip times for network packets transmitted as part of the streaming network connection.

Inter-arrival rate information 370 may indicate the inter-arrival rate for two or more network packets transmitted as part of the streaming network connection. A streaming component 340 may receive a sequence of network packets, with the inter-arrival rate for any two network packets in sequence being the amount of time between the reception of the two network packets. The inter-arrival rate information 370 may comprise a plurality of inter-arrival rates for a plurality of network packets received in sequence. The inter-arrival rate information 370 may comprise a mean, median, mode or other holistic measure of an aggregated collection of inter-arrival rates for the network packets transmitted as part of the streaming network connection.

The network performance information may be generated locally on the first client device 320 and/or may be generated on the second client device 325 and provided to the first client device 320 by the second client device 325 as part of the performance of the streaming network connection. The first client device 320 may also provide network performance information to the second client device 325 as part of the performance of the streaming network connection.

A messaging client 310 may comprise a stream configuration component 350. The stream configuration component 350 may be generally arranged to configure encoding parameters and/or network parameters for the performance of the streaming network connection. The streaming component 340 may be assigned an assigned target bitrate 390 for the streaming media content and encode the media content for the streaming network content according to the assigned target bitrate 390. Encoding the media content to the assigned target bitrate 390 may comprise providing the assigned target bitrate 390 to an encoding routine, which may operate according to the known techniques for bitrate-limited encoding of media content. The streaming component 340 may be generally arranged to transmit the encoded media content across the streaming network connection. The transmission of the encoded media content may be performed using network parameters assigned to the streaming component 340, such as a packet size setting 395 defining the network packet size for the network streaming connection.

The stream configuration component 350 may determine the assigned target bitrate 390 based on a preliminary target bitrate 380 determined by an inter-arrival rate analysis component 360. An inter-arrival rate analysis component 360 may be generally arranged to determine a preliminary target bitrate 380 based on an analysis routine operating exclusively based on inter-arrival rate information 370. The stream configuration component 350 may submit the inter-arrival rate information 370 to the inter-arrival rate analysis component 360 and receive the preliminary target bitrate 380 from the inter-arrival rate analysis component 360. The inter-arrival rate analysis component 360 may generate the preliminary target bitrate 380 according to known techniques for determining a preliminary target bitrate 380 from inter-arrival rate information 370.

Figure 4:
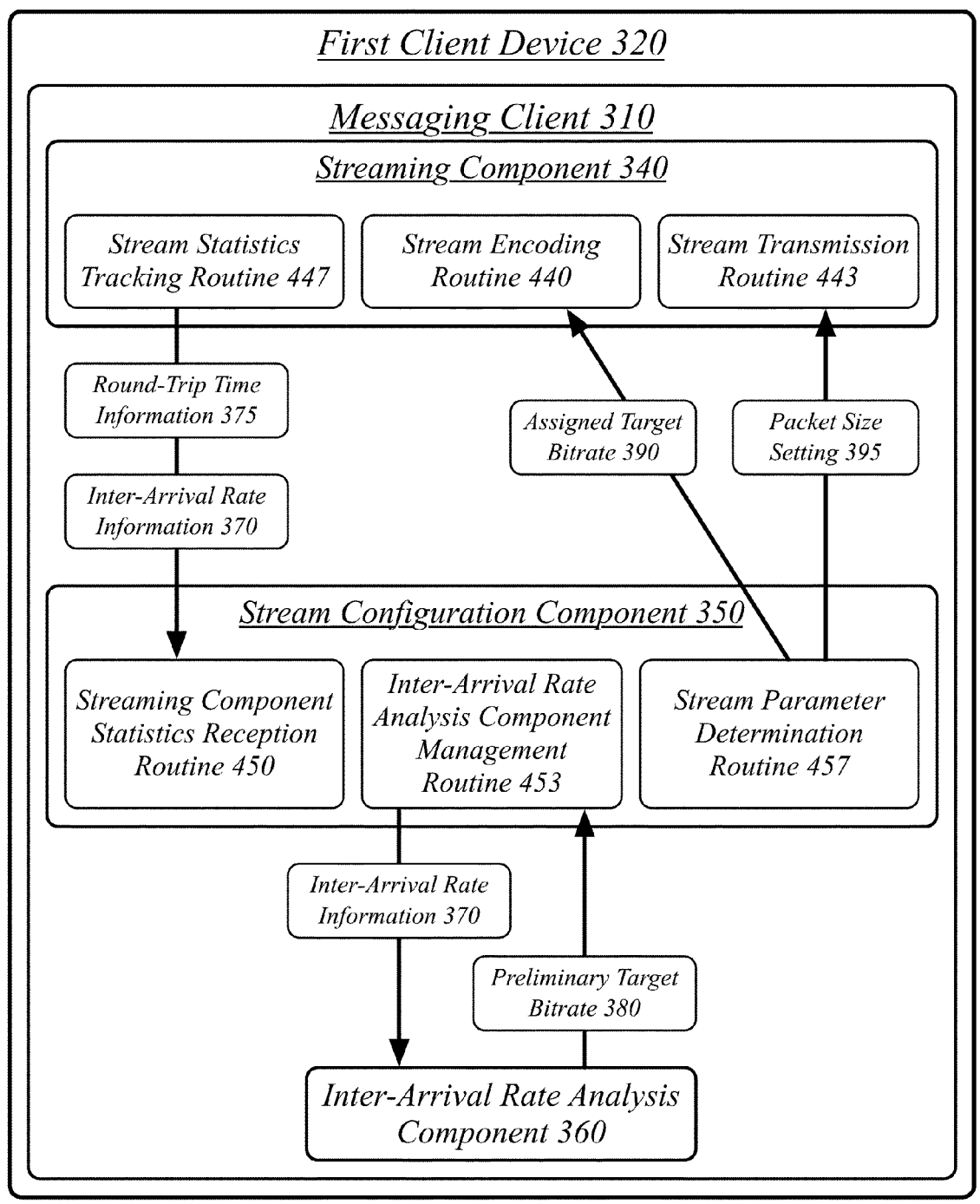
FIG. 4 illustrates an embodiment of the streaming component and stream configuration component.

FIG. 4 illustrates an embodiment of the streaming component 340 and stream configuration component 350. The streaming component 340 and the stream configuration component 350 may comprise one or more routines, the one or more routines comprising a sequence of instructions operative on a processor circuit to perform one or more tasks in the performance of the operations of the components 340, 350.

A stream transmission routine 443 of the streaming component 340 may establish a streaming network connection with a second client device 325 at a first client device 320. Establishing a streaming network connection may correspond to initiating the streaming network connection with the second client device 325 and/or a relay server 390. Establishing a streaming network connection may correspond to receiving a request to initiate a streaming network connection from a second client device 325 and/or a relay server 390 being used by the second client device 325. Establishing a streaming network connection may correspond to performing a request-and-response sequence with the second client device 325.

A stream encoding routine 440 of the streaming component 340 may receive media content for encoding, such as a locally-captured audio and/or video stream. The stream encoding routine 440 may encode the media content for transmission according to one or more audio and/or video standards. The stream encoding routine 440 may encode the media content according to a target bitrate. Encoding media content according to a target bitrate may comprise using the target bitrate as a maximum bitrate and as a preferred bitrate for when the media content represents the intended actual usage of the streaming connection. For example, less than the target bitrate may be used where silence, background noise, etc. is represented in VoIP media content instead of the voice of the user of the first client device 320.

In some embodiments, the streaming network connection may comprise an audio stream, the assigned target bitrate 390 comprising a maximum encoding bitrate for the audio stream, the maximum encoding bitrate limiting the bandwidth available for encoding the audio stream. The messaging client 310 may provide the assigned target bitrate 390 to an audio encoding routine corresponding to the stream encoding routine 440.

At the initiation and during an initial period of the stream the stream encoding routine 440 may encode the media content according to a predefined initial target bitrate, the predefined initial target bitrate representing a moderate quality level, neither the highest quality level or lowest quality level used by the messaging client 310. As such, a predefined initial target bitrate may be less than a predefined maximum bitrate and greater than a predefined minimum bitrate. Once a predefined period of time (e.g., a few seconds) has lapsed, the stream encoding routine 440 may transition to encoding the media content according to an assigned target bitrate 390 determined based on network performance information by a stream parameter determination routine 457 of the stream configuration component 350. In some embodiments, the predefined initial target bitrate may be determined according to information known about the network(s) being used, such as using a lower predefined initial target bitrate when a cellular data network is being used, or where at least a portion of a network transmission path is in particular geographic regions, as compared to a higher predefined initial target bitrate used when only Wi-Fi or better data network are being used.

A stream transmission routine 443 may receive the encoded media content and transmit it via the streaming network connection. Transmitting the encoded media content may comprise dividing the encoded media content into network packets and transmitting the network packets in sequence. The transmission of network packets may be performed using the transmission control protocol (TCP) or user datagram protocol (UDP) in conjunction with the internet protocol (IP) for addressing, as may be represented as TCP/IP or UDP/IP. The dividing of the encoded media content into network packets may be based on a packet size setting 395 assigned to the stream transmission routine 443. In some embodiments, where the stream encoding routine 440 produces encoded media content at less than the target bitrate, network packets smaller than the packet size setting 395 may be used so as to avoid significant delay in the transmission of network packets and to provide for maintenance of the streaming network connection.

At the initiation and during an initial period of the stream the stream transmission routine 443 may divide the encoded media content according to a predefined initial size setting. The predefined initial size setting may be equal to the predefined large packet size setting so as to reduce the effective bandwidth usage until the messaging client 310 has sufficient network performance information to determine whether the improved call quality, but increased bandwidth usage, of a smaller packet size is feasible. Once a predefined period of time (e.g., a few seconds) has lapsed, the stream transmission routine 443 may transition to using a packet size setting 395 specified by a stream parameter determination routine 457 of the stream configuration component 350.

While, in some embodiments, more than two packet size settings may be used, in some embodiments only two packet size settings may be used: a small packet size for improved audio quality and a large packet size for improved network performance. An embodiment may refrain from using intermediate packet sizes as part of a policy to reduce packet-size switching. The generation of network performance information may be reset during a packet-size switch due to a packet-size switch changing the rate of packet generation, and therefore the ideal rate of packet reception, and therefore the ideal inter-arrival rate. As such, using adjustments to the encoding bitrate to respond to possibly-short-term fluctuations in available bandwidth may be preferred over switching packet size due to this same resetting of network performance information gathering and the associated delay in the adjustment of network and encoding parameters. However, packet size switching may still be used to gain the benefit of improved network performance or improved audio quality, particularly in the cases of particular good or particularly poor network performance, as the use of a larger packet size merely introduces playback delay for the receiving user without the reduction in the encoded audio quality resulting from using a reduced encoding bitrate. Therefore, a low-quality threshold may be used when monitoring the round-trip time, which when exceeded causes a larger packet size to be used, as this low-quality threshold may represent sufficiently poor network performance for the network stream configuration system 100 to benefit from reserving as much bandwidth as possible for the media encoding.

The transmission of the encoded media content in packets may include the additional of one or more headers beyond the data representing the encoded media content. One or more headers may be used to provide addressing, security information, or other communication information. The effective bandwidth usage of the network stream configuration system 100 may be higher than the assigned target bitrate due to the combined bandwidth usage of the encoded media content and the headers. Each header may use a set amount of space for each packet independent of the size of the packet. As such, for a given encoded bitrate, the effective bandwidth usage may be higher where a smaller packet size is used and lower where a larger packet size is used, as the header(s) represent a larger portion of the data transmitted where more packets (i.e., smaller packets) are used than where less packets (i.e., larger packets) are used.

A stream statistics tracking routine 447 may monitor the streaming network connection and generate network performance information about the streaming network connection. The network performance information may comprise at least round-trip time information 375 and inter-arrival rate information 370. In some embodiments, the network performance information may additionally include packet loss information indicating the portion or percentage of packets lost in performance of the streaming network connection. The stream statistics tracking routine 447 may provide the network performance information to a streaming component statistics reception routine 450.

The stream configuration component 350 may comprise a streaming component statistics reception routine 450. The streaming component statistics reception routine 450 may determine inter-arrival rate information 370 for the streaming network connection, such as by receiving the inter-arrival rate information 370 from a stream statistics tracking routine 447. The streaming component statistics reception routine 450 may determine round-trip time information 375 for the streaming network connection, such as by receiving the round-trip time information 375 from the stream statistics tracking routine 447. The inter-arrival rate information 370 and round-trip time information 375 may be generated locally by the stream statistics tracking routine 447 or may be received by the first client device 320 from the second client device 325 over the streaming network connection. The stream transmission routine 443 may, in some embodiments, transmit the network performance information generated by the stream statistics tracking routine 447 to the messaging client 310 on the second client device 325.

The stream configuration component 350 may comprise an inter-arrival rate analysis component management routine 453. The inter-arrival rate analysis component management routine 453 may manage the use of a inter-arrival rate analysis component 360. The inter-arrival rate analysis component management routine 453 may provide the inter-arrival rate information 370 to an inter-arrival rate analysis component 360, such as through the use of a functional call, application program interface (API), or other technique. The inter-arrival rate analysis component management routine 453 may receive a preliminary target bitrate 380 from the inter-arrival rate analysis component 360 in response to providing the inter-arrival rate information 370 to the inter-arrival rate analysis component 360. A preliminary target bitrate 380 may comprise a target bitrate estimate made based on the inter-arrival rate information 370 but exclusive of the round-trip time information 375, the preliminary target bitrate 380 determined based on known techniques for target bitrate determination using inter-arrival rate information 370. The inter-arrival rate analysis component management routine 453 may provide the preliminary target bitrate 380 to a stream parameter determination routine 457.

The stream configuration component 350 may comprise a stream parameter determination routine 457. The stream parameter determination routine 457 may determine an assigned target bitrate 390 and a packet size setting 395 for the streaming network connection based on the preliminary target bitrate 380 and the round-trip time information 375. The stream parameter determination routine 457 may determine, based on the round-trip time information 375 whether to use the preliminary target bitrate 380 as the assigned target bitrate 390 or to replace the preliminary target bitrate 380 with an alternative target bitrate, such as a predefined minimum target bitrate or predefined maximum target bitrate. The stream parameter determination routine 457 may provide the assigned target bitrate 390 to the stream encoding routine 440. The stream parameter determination routine 457 may further specify a packet size setting 395, the packet size setting 395 determined based on the round-trip time information 375. As such, the stream parameter determination routine 457 may configure the streaming component 340 and stream transmission routine 443 to perform the streaming network connection with the assigned target bitrate 390 and the packet size setting 395.

Figure 5:
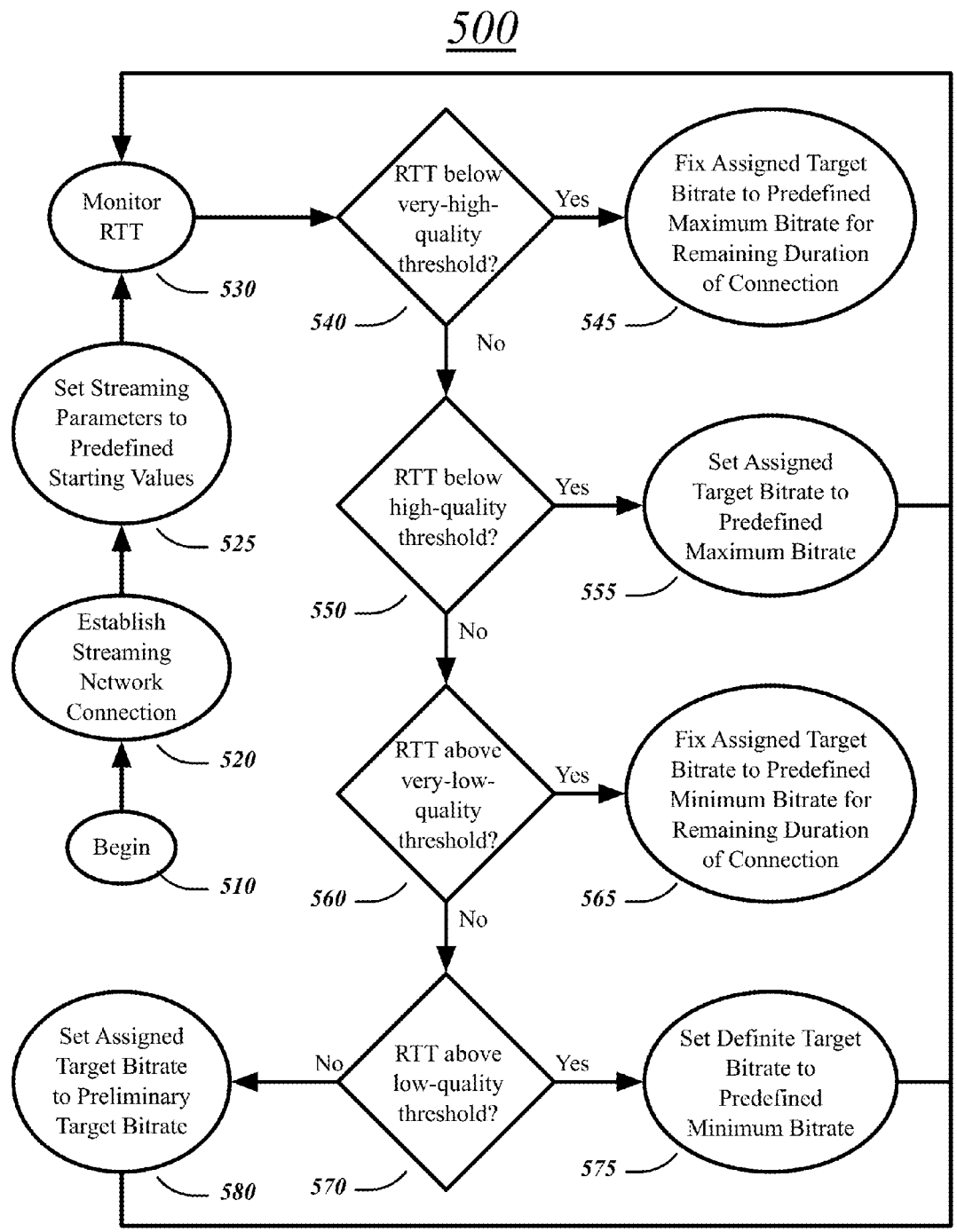
FIG. 5 illustrates an embodiment of a branching logic flow for the system of FIG. 1.

FIG. 5 illustrates an embodiment of a branching logic flow 500 for the network stream configuration system 100 of FIG. 1.

The logic flow 500 may begin at block 510. The logic flow 500 may begin in response to a user requesting the initiation of a streaming network connection, such as for the performance of a communication task. In general, the logic flow 500 may end execution at the conclusion of the streaming network connection.

The logic flow 500 may establish a streaming network connection at block 520. Establishing a streaming network connection may comprise using a messaging system 200 to coordinate the establishment of the streaming network connection. A messaging system 200 may identify to an initiating client device a destination network address for use in contacting a destination client device, which may correspond to the public-facing network address for the destination client device or may correspond to a network address for a relay server 390.

The logic flow 500 may set streaming parameters to predefined starting value at block 525. A predefined initial target bitrate may be less than a predefined maximum bitrate and greater than the predefined minimum bitrate. A predefined initial size setting for network packets may be equal to a predefined large packet size setting.

The logic flow 500 may monitor the round-trip time (RTT) for the streaming network connection at block 530. The logic flow 500 may further monitor the inter-arrival rate for the streaming network connection. The logic flow 500 may proceed to perform a series of comparisons of the RTT against various thresholds to determine whether to use a preliminary target bitrate provided by an inter-arrival rate analysis component 360 or to use an alternative target bitrate. While the preliminary target bitrate provided by the inter-arrival rate analysis component 360 may typically be a useful target bitrate, in some cases a judgment based on the inter-arrival rate may be inaccurate and the logic flow 500 may correct the target bitrate based on the RTT.

The logic flow 500 may determine whether the RTT is below a very-high-quality threshold at block 540. The RTT being below a very-high-quality threshold may indicate that the network over which the streaming network connection is being performed is of a very high quality, as a lower RTT is indicative of better network performance. As such, high-quality encodings and network parameters may be used. If the RTT is below the very-high-quality threshold the logic flow 500 may proceed to block 545. Otherwise, the logic flow 500 may proceed to block 550.

The logic flow 500 may fix the assigned target bitrate 390 to a predefined maximum bitrate for a remaining duration of the streaming network connection based on the determined round-trip time information being below the predefined very-high-quality round-trip-time threshold at block 545. The logic flow 500 may additionally or alternatively fix the packet size setting 395 to a predefined small packet size based on the determined round-trip time information being below the predefined very-high-quality round-trip-time threshold. In some embodiments, the logic flow 500 may end execution after fixing the assigned target bitrate 390 and/or packet size setting 395. In other embodiments, however, fixation may not be used. In these embodiments, the logic flow 500 may not include blocks 540 and 545 and may proceed directly from block 530 to block 550. In some embodiments, the logic flow 500 may fix only one of the assigned target bitrate 390 and packet size setting 395 and merely assign the other in this particular iteration of the loop of the logic flow 500 while leaving that parameter available to set to a different value in a later iteration of the loop.

The logic flow may determine whether the RTT is below a high-quality threshold at block 550. The RTT being below a high-quality threshold may indicate that the network over which the streaming network connection is being performed is of a high quality. Where a very-high-quality threshold associated with network parameter fixation is used, the high-quality threshold may be higher than the very-high-quality threshold such that there exists a range of RTT value that are lower than the high-quality threshold but that are not lower than the very-high-quality threshold. As such, in some embodiments, the RTT being below the high-quality threshold but not being below the very-high-quality threshold may indicate the network over which the streaming network connection is being performed is high-enough quality to support the maximum bitrate and a small packet size setting, but not yet showing evidence of being sufficiently high-quality to support fixing the network parameters to their highest-quality settings. If the RTT is below the high-quality threshold the logic flow 500 may proceed to block 555. Otherwise, the logic flow 500 may proceed to block 560.

The logic flow 500 may set the assigned target bitrate 390 to the predefined maximum bitrate where the determined round-trip time information is below a predefined high-quality round-trip-time threshold at block 555. The logic flow 500 may further set the packet size setting to a predefined small packet size setting where the determined round-trip time information is below the predefined high-quality round-trip-time threshold. The logic flow 500 may then proceed to block 530, so as to engage or continue a loop of monitoring network performance and assigning network parameters.

The logic flow 500 may determine whether the RTT is above a very-low-quality threshold at block 560. The RTT being above a very-low-quality threshold may indicate that the network over which the streaming network connection is being performed is of a very low quality, as a higher RTT is indicative of worse network performance. It will be appreciated that a "very low quality" network may correspond to a network operating close to its capacity, and does not necessarily indicate absolute problems with network infrastructure, network operation, etc. As such, low-quality encodings and network parameters may be used. If the RTT is above the very-low-quality threshold the logic flow 500 may proceed to block 565. Otherwise, the logic flow 500 may proceed to block 570.

The logic flow 500 may fix the assigned target bitrate 390 to a predefined minimum bitrate for a remaining duration of the streaming network connection based on the determined round-trip time information being above the predefined very-low-quality round-trip-time threshold at block 565. The logic flow 500 may additionally or alternatively fix the packet size setting 395 to a predefined large packet size based on the determined round-trip time information being above the predefined very-low-quality round-trip-time threshold. In some embodiments, the logic flow 500 may end execution after fixing the assigned target bitrate 390 and/or packet size setting 395. In other embodiments, however, fixation may not be used. In these embodiments, the logic flow 500 may not include blocks 560 and 565 and may proceed directly from block 550 to block 570 rather than to block 560. In some embodiments, the logic flow 500 may fix only one of the assigned target bitrate 390 and packet size setting 395 and merely assign the other in this particular iteration of the loop of the logic flow 500 while leaving that parameter available to set to a different value in a later iteration of the loop.

The logic flow may determine whether the RTT is above a low-quality threshold at block 570. The RTT being above a low-quality threshold may indicate that the network over which the streaming network connection is being performed is of a low quality. Where a very-low-quality threshold associated with network parameter fixation is used, the low-quality threshold may be lower than the very-low-quality threshold such that there exists a range of RTT value that are higher than the low-quality threshold but that are not higher than the very-low-quality threshold. As such, in some embodiments, the RTT being above the low-quality threshold but not being above the very-low-quality threshold may indicate the network over which the streaming network connection is being performed is low-enough quality to demand the minimum target bitrate and a large packet size setting, but not yet showing evidence of being sufficiently low-quality to support fixing the network parameters to their lowest-quality settings. If the RTT is above the low-quality threshold the logic flow 500 may proceed to block 575. Otherwise, the logic flow 500 may proceed to block 580.

The logic flow 500 may set the assigned target bitrate 390 to the predefined minimum bitrate where the determined round-trip time information is below a predefined low-quality round-trip-time threshold at block 575. The logic flow 500 may further set the packet size setting to a predefined large packet size setting where the determined round-trip time information is above the predefined low-quality round-trip-time threshold. The logic flow 500 may then proceed to block 530, so as to engage or continue a loop of monitoring network performance and assigning network parameters.

The logic flow 500 may set the assigned target bitrate 390 to the preliminary target bitrate 380 where the round-trip time information is above a predefined high-quality round-trip-time threshold and below a predefined low-quality round-trip-time threshold at block 580. The analysis of the RTT may act as a check on the analysis of the inter-arrival rate performed by the inter-arrival rate analysis component 360, and as such the analysis of the RTT may only determine the encoding and/or network parameters where an extreme network condition is detected. The RTT being between the predefined RTT thresholds may mean that the RTT does not indicate that any extreme network conditions are affecting the streaming network connection, and as such the preliminary target bitrate 380 should be used The logic flow 500 may then proceed to block 530, so as to engage or continue a loop of monitoring network performance and assigning network parameters.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may establish a streaming network connection with a second client device at a first client device at block 602.

The logic flow 600 may determine inter-arrival rate information for the streaming network connection at block 604.

The logic flow 600 may provide the inter-arrival rate information to an inter-arrival rate analysis component at block 606.

The logic flow 600 may receive a preliminary target bitrate from the inter-arrival rate analysis component in response to providing the inter-arrival rate information to the inter-arrival rate analysis component at block 608.

The logic flow 600 may determine round-trip time information for the streaming network connection at block 610.

The logic flow 600 may determine an assigned target bitrate and a packet size setting for the streaming network connection based on the preliminary target bitrate and the round-trip time information at block 612.

The logic flow 600 may configure the streaming component to perform the streaming network connection with the assigned target bitrate and the packet size setting at block 614.

The embodiments are not limited to this example.

Figure 7:
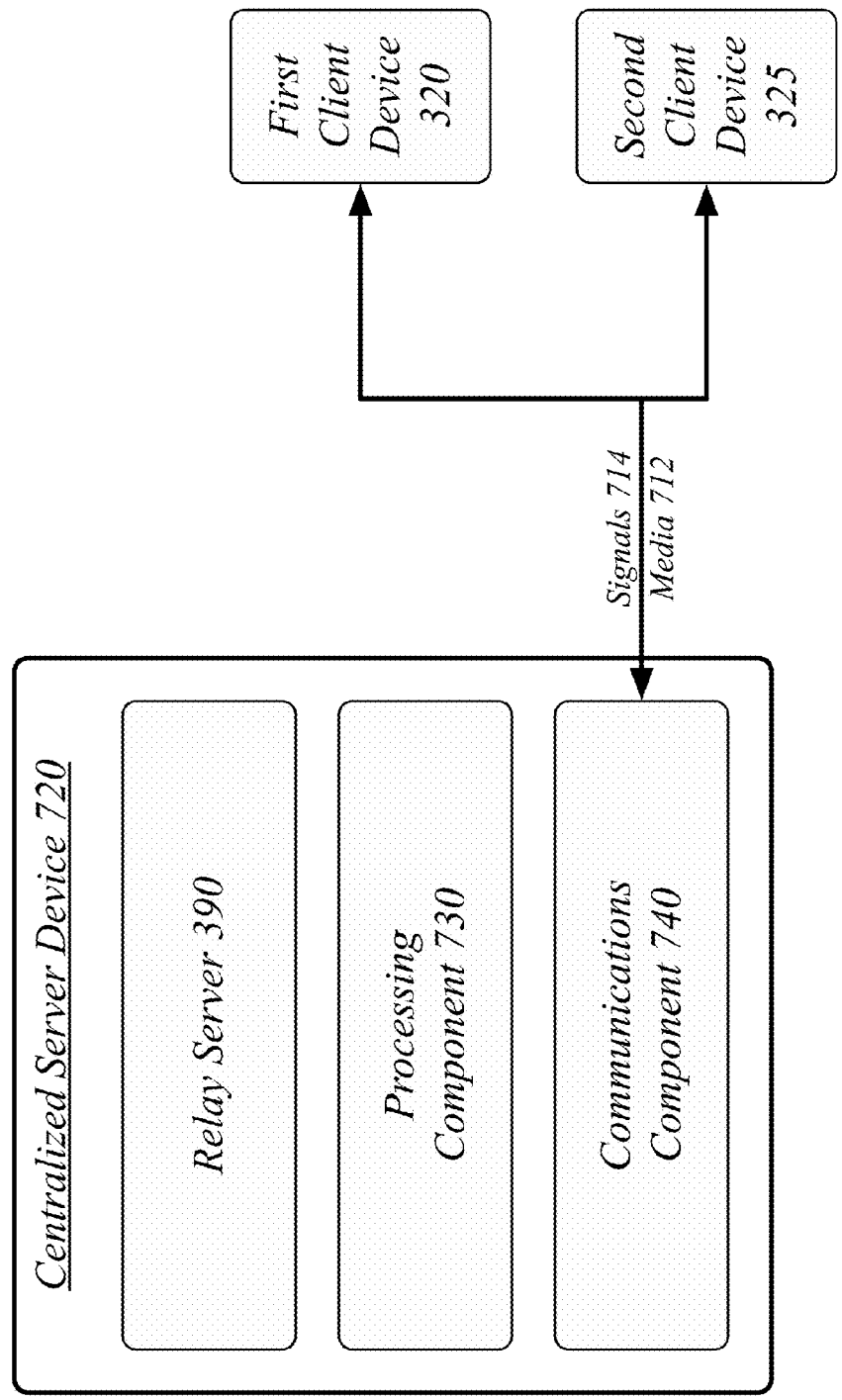
FIG. 7 illustrates an embodiment of a centralized system for the system of FIG. 1.

FIG. 7 illustrates a block diagram of a centralized system 700. The centralized system 700 may implement some or all of the structure and/or operations for the network stream configuration system 100 in a single computing entity, such as entirely within a single centralized server device 720.

The centralized server device 720 may comprise any electronic device capable of receiving, processing, and sending information for the network stream configuration system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the network stream configuration system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the network stream configuration system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The centralized server device 720 may execute a relay server 390, the relay server 390 operative to assist in the performance of streaming network connections. The relay server 390 may receive and forward network packets between the first client device 320 and second client device 325 as assistance to the performance of a streaming network connection, the receiving and forwarding of network packets comprising at least a portion of the signals 714 transmitted via media 712.

Figure 8:
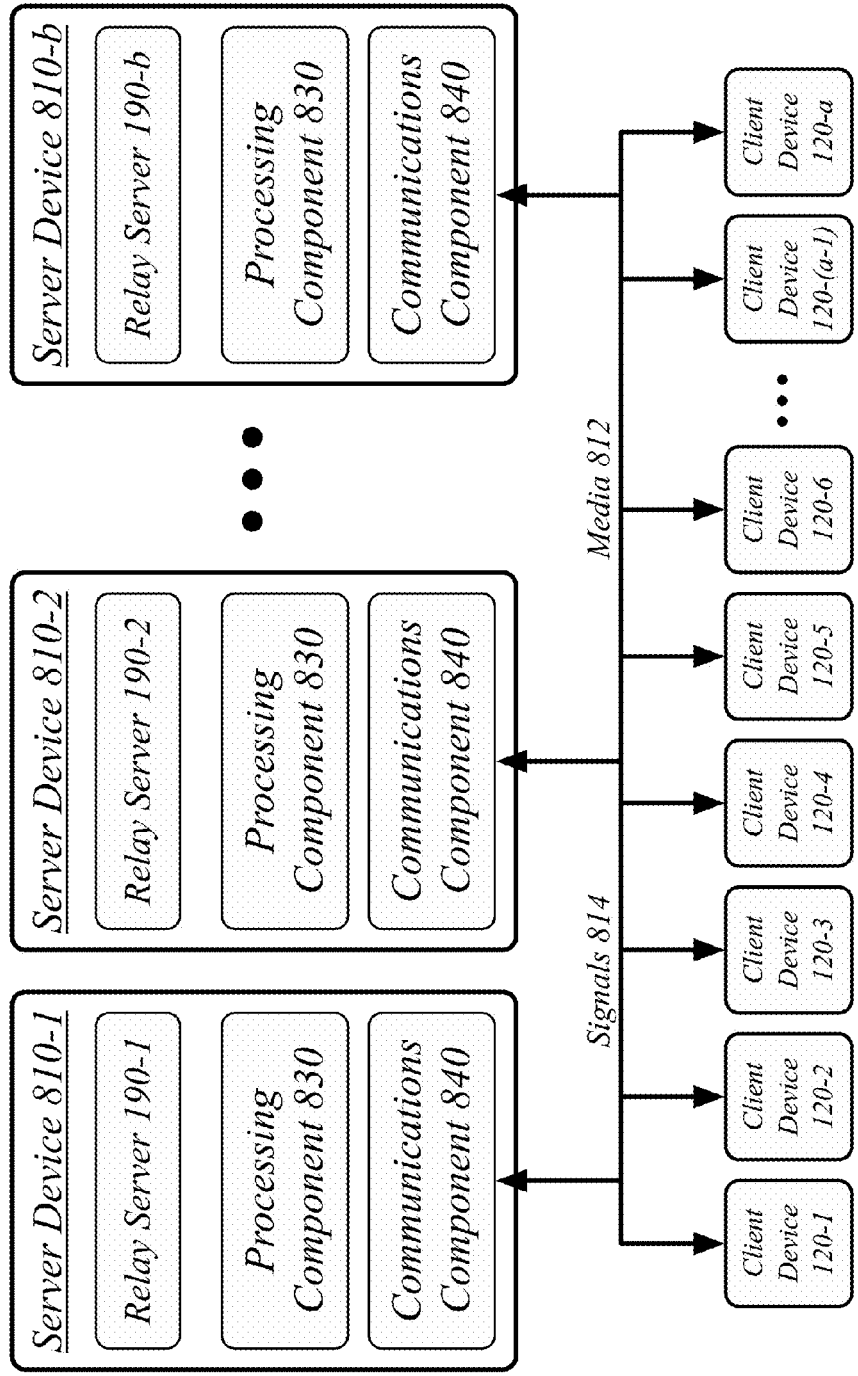
FIG. 8 illustrates an embodiment of a distributed system for the system of FIG. 1.

FIG. 8 illustrates a block diagram of a distributed system 800. The distributed system 800 may distribute portions of the structure and/or operations for the network stream configuration system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of server devices 810. In general, the server devices 810 may be the same or similar to the centralized server device 720 as described with reference to FIG. 7. For instance, the server devices 810 may each comprise a processing component 830 and a communications component 840 which are the same or similar to the processing component 730 and the communications component 740, respectively, as described with reference to FIG. 7. In another example, the server devices 810 may communicate over a communications media 812 using communications signals 814 via the communications components 840.

The server devices 810 may comprise or employ one or more programs that operate to perform various methodologies in accordance with the described embodiments. In one embodiment, for example, the server devices 810 may each implement a relay server of a plurality of relay servers 190, as described with reference to FIG. 1.

Figure 9:
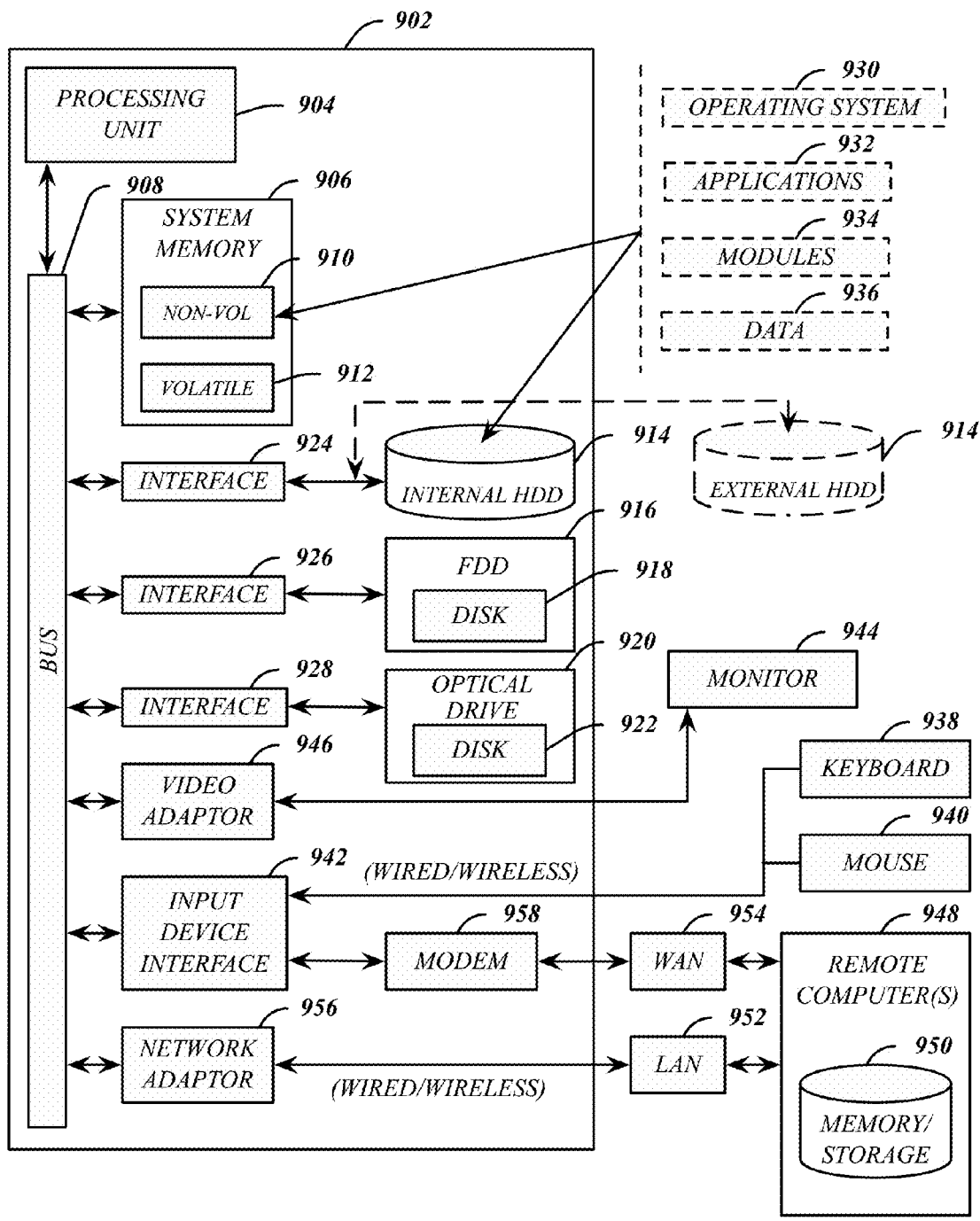
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIGS. 1, 3, 7, and 8, among others, such as the client devices 120, the first client device 320, the second client device 325, the centralized server device 720, and the server devices 810. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the network stream configuration system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
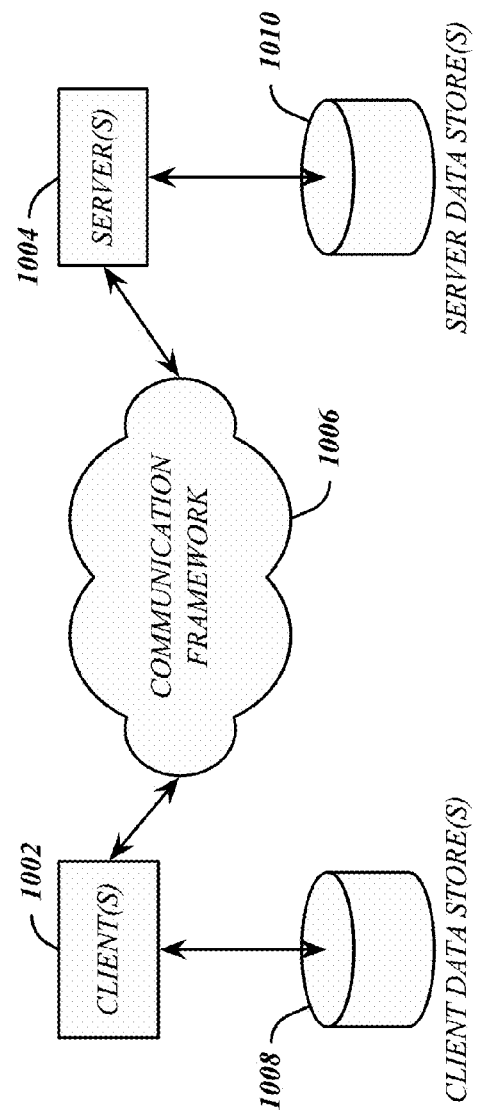
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the first server device 910. The servers 1004 may implement the second server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
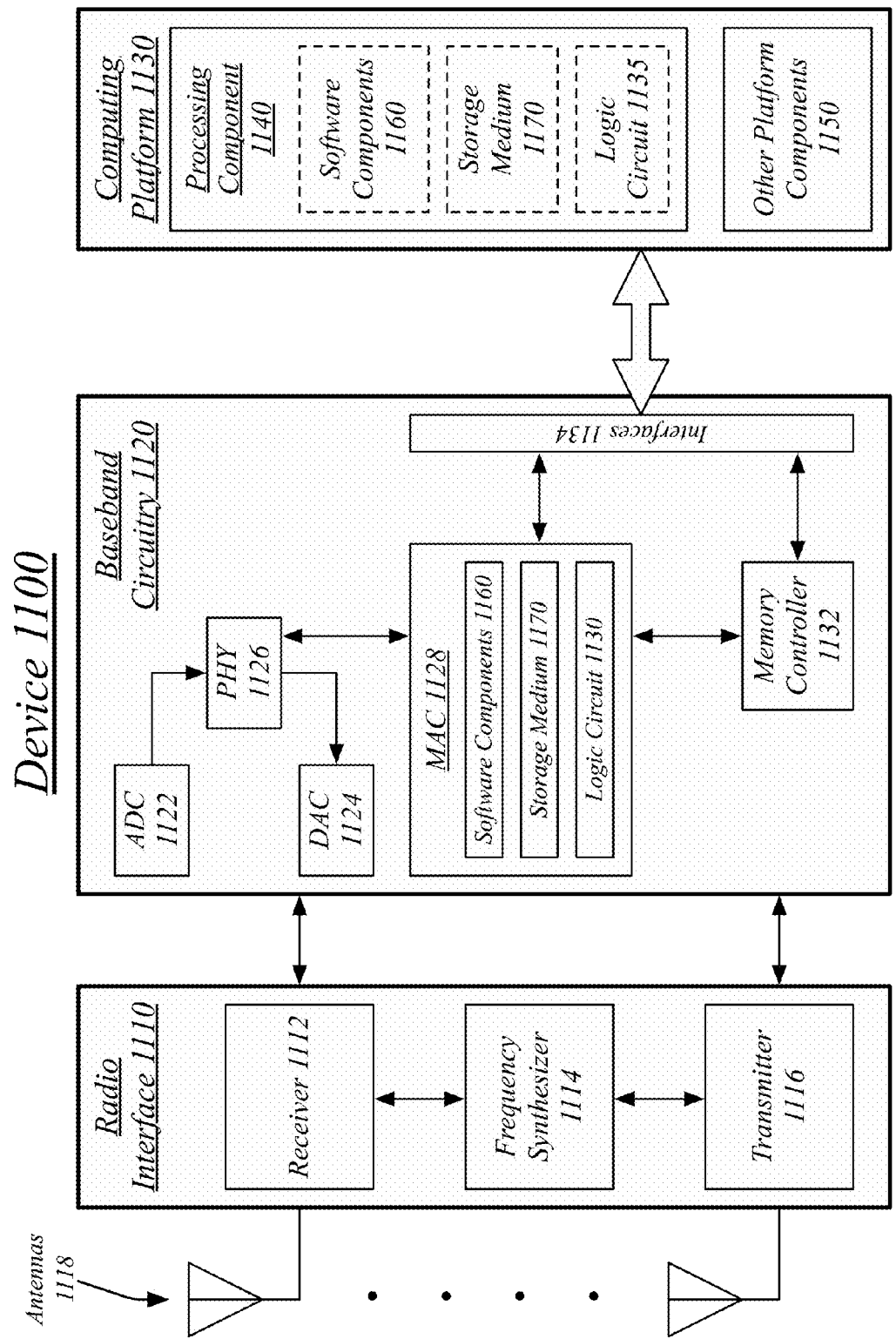
FIG. 11 illustrates an embodiment of a radio device architecture.

FIG. 11 illustrates an embodiment of a device 1100 for use in a multicarrier OFDM system, such as the network stream configuration system 100. Device 1100 may implement, for example, software components 1160 as described with reference to network stream configuration system 100 and/or a logic circuit 1135. The logic circuit 1135 may include physical circuits to perform operations described for the network stream configuration system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the network stream configuration system 100 and/or logic circuit 1135 in a single computing entity, such as entirely within a single device. Alternatively, the device 1100 may distribute portions of the structure and/or operations for the network stream configuration system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the network stream configuration system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise establishing a streaming network connection with a second client device at a first client device; determining inter-arrival rate information for the streaming network connection; providing the inter-arrival rate information to an inter-arrival rate analysis component; receiving a preliminary target bitrate from the inter-arrival rate analysis component in response to providing the inter-arrival rate information to the inter-arrival rate analysis component; determining round-trip time information for the streaming network connection; determining an assigned target bitrate and a packet size setting for the streaming network connection based on the preliminary target bitrate and the round-trip time information; and configuring the streaming network connection with the assigned target bitrate and the packet size setting.

A computer-implemented method may further comprise the streaming network connection transmitted via a relay server device.

A computer-implemented method may further comprise the streaming network connection comprising an audio stream, the assigned target bitrate comprising a maximum encoding bitrate for the audio stream, further comprising: providing the assigned target bitrate to an audio encoding routine.

A computer-implemented method may further comprise configuring the streaming network connection with a predefined initial target bitrate, the predefined initial target bitrate less than the predefined maximum bitrate, the predefined initial target bitrate greater than the predefined minimum bitrate; and configuring the streaming network connection with a predefined initial packet size setting, the predefined initial size setting equal to a predefined large packet size setting.

A computer-implemented method may further comprise wherein determining the assigned target bitrate comprises setting the assigned target bitrate to a predefined maximum bitrate where the determined round-trip time information is below a predefined high-quality round-trip-time threshold.

A computer-implemented method may further comprise wherein determining the packet size setting comprises setting the packet size setting to a predefined small packet size setting where the determined round-trip time information is below the predefined high-quality round-trip-time threshold.

A computer-implemented method may further comprise wherein determining the assigned target bitrate comprises fixing the assigned target bitrate to a predefined maximum bitrate for a remaining duration of the streaming network connection where the determined round-trip time information is below a predefined very-high-quality round-trip-time threshold.

A computer-implemented method may further comprise wherein determining the assigned target bitrate and the packet size setting comprises setting the assigned target bitrate to a predefined minimum bitrate and setting the packet size setting to a predefined large packet size setting where the determined round-trip time information above a predefined low-quality round-trip-time threshold.

A computer-implemented method may further comprise wherein determining the packet size setting comprises setting the packet size setting to a predefined large packet size setting for a remaining duration of the streaming network connection where the determined round-trip time information is above a predefined very-low-quality round-trip-time threshold.

A computer-implemented method may further comprise wherein determining the assigned target bitrate comprises setting the assigned target bitrate to the preliminary target bitrate where the round-trip time information is above a predefined high-quality round-trip-time threshold and below a predefined low-quality round-trip-time threshold.

An apparatus may comprise a processor circuit on a device; a streaming component operative on the processor circuit to establish a streaming network connection with a second client device at a first client device; and a stream configuration component operative on the processor circuit to determine inter-arrival rate information for the streaming network connection; provide the inter-arrival rate information to an inter-arrival rate analysis component; receive a preliminary target bitrate from the inter-arrival rate analysis component in response to providing the inter-arrival rate information to the inter-arrival rate analysis component; determine round-trip time information for the streaming network connection; determine an assigned target bitrate and a packet size setting for the streaming network connection based on the preliminary target bitrate and the round-trip time information; and configure the streaming component to perform the streaming network connection with the assigned target bitrate and the packet size setting. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
    establishing a streaming network connection with a second client device at a first client device;
    determining inter-arrival rate information for the streaming network connection;
    providing the inter-arrival rate information to an inter-arrival rate analysis component;
    receiving a preliminary target bitrate from the inter-arrival rate analysis component in response to providing the inter-arrival rate information to the inter-arrival rate analysis component;
    determining round-trip time information for the streaming network connection;
    determining an assigned target bitrate and a packet size setting for the streaming network connection based on the preliminary target bitrate and the round-trip time information; and
    configuring the streaming network connection with the assigned target bitrate and the packet size setting.

2. The method of claim 1, further comprising:
    configuring the streaming network connection with a predefined initial target bitrate, the predefined initial target bitrate less than the predefined maximum bitrate, the predefined initial target bitrate greater than the predefined minimum bitrate; and
    configuring the streaming network connection with a predefined initial packet size setting, the predefined initial size setting equal to a predefined large packet size setting.

3. The method of claim 1, wherein determining the assigned target bitrate comprises setting the assigned target bitrate to a predefined maximum bitrate where the determined round-trip time information is below a predefined high-quality round-trip-time threshold.

4. The method of claim 3, wherein determining the packet size setting comprises setting the packet size setting to a predefined small packet size setting where the determined round-trip time information is below the predefined high-quality round-trip-time threshold.

5. The method of claim 1, wherein determining the assigned target bitrate comprises fixing the assigned target bitrate to a predefined maximum bitrate for a remaining duration of the streaming network connection where the determined round-trip time information is below a predefined very-high-quality round-trip-time threshold.

6. The method of claim 1, wherein determining the assigned target bitrate and the packet size setting comprises setting the assigned target bitrate to a predefined minimum bitrate and setting the packet size setting to a predefined large packet size setting where the determined round-trip time information above a predefined low-quality round-trip-time threshold.

7. The method of claim 1, wherein determining the packet size setting comprises setting the packet size setting to a predefined large packet size setting for a remaining duration of the streaming network connection where the determined round-trip time information is above a predefined very-low-quality round-trip-time threshold.

8. The method of claim 1, wherein determining the assigned target bitrate comprises setting the assigned target bitrate to the preliminary target bitrate where the round-trip time information is above a predefined high-quality round-trip-time threshold and below a predefined low-quality round-trip-time threshold.

9. An apparatus, comprising:
    a processor circuit on a device;
    a streaming component operative on the processor circuit to establish a streaming network connection with a second client device at a first client device; and
    a stream configuration component operative on the processor circuit to determine inter-arrival rate information for the streaming network connection; provide the inter-arrival rate information to an inter-arrival rate analysis component; receive a preliminary target bitrate from the inter-arrival rate analysis component in response to providing the inter-arrival rate information to the inter-arrival rate analysis component; determine round-trip time information for the streaming network connection; determine an assigned target bitrate and a packet size setting for the streaming network connection based on the preliminary target bitrate and the round-trip time information; and configure the streaming component to perform the streaming network connection with the assigned target bitrate and the packet size setting.

10. The apparatus of claim 9, wherein determining the assigned target bitrate comprises setting the assigned target bitrate to a predefined maximum bitrate where the determined round-trip time information is below a predefined high-quality round-trip-time threshold and determining the packet size setting comprises setting the packet size setting to a predefined small packet size setting where the determined round-trip time information is below the predefined high-quality round-trip-time threshold.

11. The apparatus of claim 9, wherein determining the assigned target bitrate comprises fixing the assigned target bitrate to a predefined maximum bitrate for a remaining duration of the streaming network connection where the determined round-trip time information is below a predefined very-high-quality round-trip-time threshold.

12. The apparatus of claim 9, wherein determining the assigned target bitrate and the packet size setting comprises setting the assigned target bitrate to a predefined minimum bitrate and setting the packet size setting to a predefined large packet size setting where the determined round-trip time information above a predefined low-quality round-trip-time threshold.

13. The apparatus of claim 9, wherein determining the packet size setting comprises setting the packet size setting to a predefined large packet size setting for a remaining duration of the streaming network connection where the determined round-trip time information is above a predefined very-low-quality round-trip-time threshold.

14. The apparatus of claim 9, wherein determining the assigned target bitrate comprises setting the assigned target bitrate to the preliminary target bitrate where the round-trip time information is above a predefined high-quality round-trip-time threshold and below a predefined low-quality round-trip-time threshold.

15. At least one non-transitory computer-readable storage medium comprising instructions that, when executed, cause a system to:
    establish a streaming network connection with a second client device at a first client device;
    determine inter-arrival rate information for the streaming network connection;
    provide the inter-arrival rate information to an inter-arrival rate analysis component;

receive a preliminary target bitrate from the inter-arrival rate analysis component in response to providing the inter-arrival rate information to the inter-arrival rate analysis component;

determine round-trip time information for the streaming network connection;

determine an assigned target bitrate and a packet size setting for the streaming network connection based on the preliminary target bitrate and the round-trip time information; and configure the streaming component to perform the streaming network connection with the assigned target bitrate and the packet size setting.

16. The computer-readable storage medium of claim 15, wherein determining the assigned target bitrate comprises setting the assigned target bitrate to a predefined maximum bitrate where the determined round-trip time information is below a predefined high-quality round-trip-time threshold and determining the packet size setting comprises setting the packet size setting to a predefined small packet size setting where the determined round-trip time information is below the predefined high-quality round-trip-time threshold.

17. The computer-readable storage medium of claim 15, wherein determining the assigned target bitrate comprises fixing the assigned target bitrate to a predefined maximum bitrate for a remaining duration of the streaming network connection where the determined round-trip time information is below a predefined very-high-quality round-trip-time threshold.

18. The computer-readable storage medium of claim 15, wherein determining the assigned target bitrate and the packet size setting comprises setting the assigned target bitrate to a predefined minimum bitrate and setting the packet size setting to a predefined large packet size setting where the determined round-trip time information above a predefined low-quality round-trip-time threshold.

19. The computer-readable storage medium of claim 15, wherein determining the packet size setting comprises setting the packet size setting to a predefined large packet size setting for a remaining duration of the streaming network connection where the determined round-trip time information is above a predefined very-low-quality round-trip-time threshold.

20. The computer-readable storage medium of claim 15, wherein determining the assigned target bitrate comprises setting the assigned target bitrate to the preliminary target bitrate where the round-trip time information is above a predefined high-quality round-trip-time threshold and below a predefined low-quality round-trip-time threshold.

\* \* \* \* \*